US012110875B2

(12) United States Patent
Ghinda

(10) Patent No.: US 12,110,875 B2
(45) Date of Patent: Oct. 8, 2024

(54) INSTALLATION FOR THE COMBINED CONVERSION OF WAVE, WIND AND SOLAR ENERGIES INTO ELECTRICAL ENERGY

(71) Applicant: Nicolae Ghinda, Hammond (CA)

(72) Inventor: Nicolae Ghinda, Hammond (CA)

( * ) Notice: Subject to any disclaimer, the term of this patent is extended or adjusted under 35 U.S.C. 154(b) by 0 days.

(21) Appl. No.: 18/085,729

(22) Filed: Dec. 21, 2022

(65) Prior Publication Data

US 2024/0209837 A1    Jun. 27, 2024

(51) Int. Cl.

| | |
|---|---|
| *F03D 9/00* | (2016.01) |
| *F03B 13/00* | (2006.01) |
| *H02K 7/18* | (2006.01) |
| *H02S 10/12* | (2014.01) |
| *H02S 10/40* | (2014.01) |
| *H02S 20/32* | (2014.01) |
| *H02S 40/22* | (2014.01) |
| *H02S 40/32* | (2014.01) |

(52) U.S. Cl.
CPC ............. *F03D 9/007* (2013.01); *F03B 13/00* (2013.01); *H02K 7/183* (2013.01); *H02S 10/12* (2014.12); *H02S 10/40* (2014.12); *H02S 20/32* (2014.12); *H02S 40/22* (2014.12); *H02S 40/32* (2014.12); *F05B 2240/93* (2013.01)

(58) Field of Classification Search
CPC ......... F03D 9/007; F03B 13/00; H02K 7/183; H02S 10/12; H02S 10/40; H02S 20/32; H02S 40/22; H02S 40/32
USPC .................... 290/4 R, 42, 43, 44, 53, 54, 55
See application file for complete search history.

(56) References Cited

U.S. PATENT DOCUMENTS

| | | | | |
|---|---|---|---|---|
| 6,559,552 B1* | 5/2003 | Ha | .......................... | F03B 13/00 290/55 |
| 7,963,112 B1* | 6/2011 | Joseph | .................... | F03D 15/10 60/497 |
| 8,601,808 B1* | 12/2013 | Joseph | ...................... | F03D 9/12 60/495 |
| 10,526,056 B1* | 1/2020 | Hakki | ..................... | F03D 1/025 |
| 11,770,095 B2* | 9/2023 | Gomberg | ................ | H02S 20/00 290/53 |

(Continued)

FOREIGN PATENT DOCUMENTS

WO    WO-2008102980 A1 *    8/2008    .......... F03B 13/1815

*Primary Examiner* — Charles Reid, Jr.

(57) ABSTRACT

The invention refers to a combined power generator for near shore area wherein on a support frame are mounted, at the base a vertical wave turbine coupled by a ratchet coupling to a wind turbine coupled in its turn by a speed raising coupling to an electric generator and above a photovoltaic platform with solar tracking system, with bi-facial photovoltaic panels, with a system of mirrors for the reflection of light on the back of the bi-facial photovoltaic panels, a hybrid controller and an inverter for taking over the electricity from the electric generator and the photovoltaic panels respectively and the transformation to the corresponding parameters for sending into the electrical network. By placing the three convertors vertically the energy efficiency on the surface unit in near-shore areas increase. Other advantages of the installation are: constructive simplicity, low price of construction, maintenance and operation, wave breaker.

9 Claims, 4 Drawing Sheets

(56) References Cited

U.S. PATENT DOCUMENTS

| | | | |
|---|---|---|---|
| 2009/0015015 A1* | 1/2009 | Joutsiniemi | F03D 3/02 |
| | | | 290/52 |
| 2009/0261595 A1* | 10/2009 | Poo | F03D 3/02 |
| | | | 290/55 |
| 2009/0267347 A1* | 10/2009 | Abatemarco | F03B 13/10 |
| | | | 290/43 |
| 2011/0254275 A1* | 10/2011 | Joseph | F03D 15/10 |
| | | | 60/716 |

* cited by examiner

INSTALLATION FOR THE COMBINED CONVERSION OF WAVE, WIND AND SOLAR ENERGIES INTO ELECTRICAL ENERGY

FIELD OF THE INVENTION

The invention relates to the field of renewable energy sources, namely the installations for the combined conversion of wave, wind and solar energies into electrical energy in the nearshore areas.

BACKGROUND

There are known renewable energy installations/platforms that combine the conversion of the three types of renewable energy (solar, wind, waves) into electrical energy.

We can list in this respect the patent "Complex generator using solar and wind and wave"—WO 2008/102980 A1, the patent "Generation of electric power using wave motion, wind energy and solar energy"—U.S. Pat. No. 10,526,056.B1, the platform "Floating multipurpose platform" developed by SINN Power company and the "Flex2power" platform developed by Worley company.

They have the disadvantage that they are more complex, requiring high construction, maintenance and operation costs, and the three converters are placed dispersed, independently of each other.

Wave/wind turbines are not interconnected and are not designed to work in both regimes (wave/wind) depending on the height of the waves.

Also, there are known photovoltaic platforms/structures equipped with solar tracking system but which have not been adapted to the nearshore areas and nor interconnected with the other renewable energy converters (wind and waves).

SUMMARY OF THE INVENTION

A technical problem that the invention solves is the minimization of the area occupied by the three interconnected converters.

Designing of turbines that can work in both modes (wind/waves) and be vertically coupled without disturbing each other is the second technical problem solved.

The third technical problem solved is the development of a photovoltaic structure with tracking system and with a support frame which comprises wave and wind turbines, in nearshore areas.

The installation for the combined conversion of wave, wind and solar energies into electrical energy according to the invention is characterized by the interconnected mounting, on the same support frame, vertically of the three renewable energy converters, namely:
- at the base a wave turbine whose vertical axis has a flywheel mounted at the bottom end and at the top end is coupled by means of a ratchet coupling at the bottom end of the axis of a wind turbine, which in its turn at the upper end is coupled by means of a speed-raising coupling to an electric generator;
- above and supported on the support frame is mounted a platform with solar tracker system on which are placed bifacial solar panels and a system of mirrors for reflecting light on the back of the solar panels and also a hybrid controller and an inverter for taking over the electricity from the electric generator and from the photovoltaic structure and transforming it to the appropriate parameters for sending into the electrical network;
- a second mirror system is installed on the side of the support frame.

The two turbines, being practically identical, designed to work both in wave and wind regime are characterized by the fact that they have fixed radially on the axis several groups of three metal arms; at the outer ends of the lower and upper arm are fixed with the help of hinges some blades of aerodynamic shape and the arm in the middle has the role of support to prevent the destruction of the blades when subjected to high forces of the waves/winds.

The ratchet coupling is characterized by the superposition of two neck flanges, one mounted at the upper end of the wave turbine axis with some teeth at the upper edge of this flange and the second mounted at the bottom end of the wind turbine axis on which is mounted a lever supported on a support, lever that is oriented to get stuck in the teeth when the wave energy is significant compared to the wind energy so that the two turbines simultaneously transmit energy to the electric generator unless when the wave energy is insignificant, the ratchet performing in this case the decoupling of the wave turbine.

In order to increase the stability of the installation in relation to the seabed, some rectangular metal frames supported on concrete blocks are mounted in the corners on the diagonal extensions of the horizontal section of the support frame A of the installation on its closest side to the shore, more precisely on the opposite side of the side facing de waves, or in the case of making a network of installations (energy park) they are fixed diagonally to each other by means of these frames for fixing.

If the installation in the field is more difficult and expensive, the installation can be mounted on a pontoon with fixing anchor and also a network of installations (energy park) could be mounted on pontoons that can be coupled to each other with some articulated arms.

BRIEF DESCRIPTION OF THE DRAWINGS

Other advantages and characteristics emerge more clearly from the following description presented on the basis of a non-limiting embodiment of the invention and represented in the attached drawings in which.

DETAILED DESCRIPTION OF THE INVENTION

Figure 1:
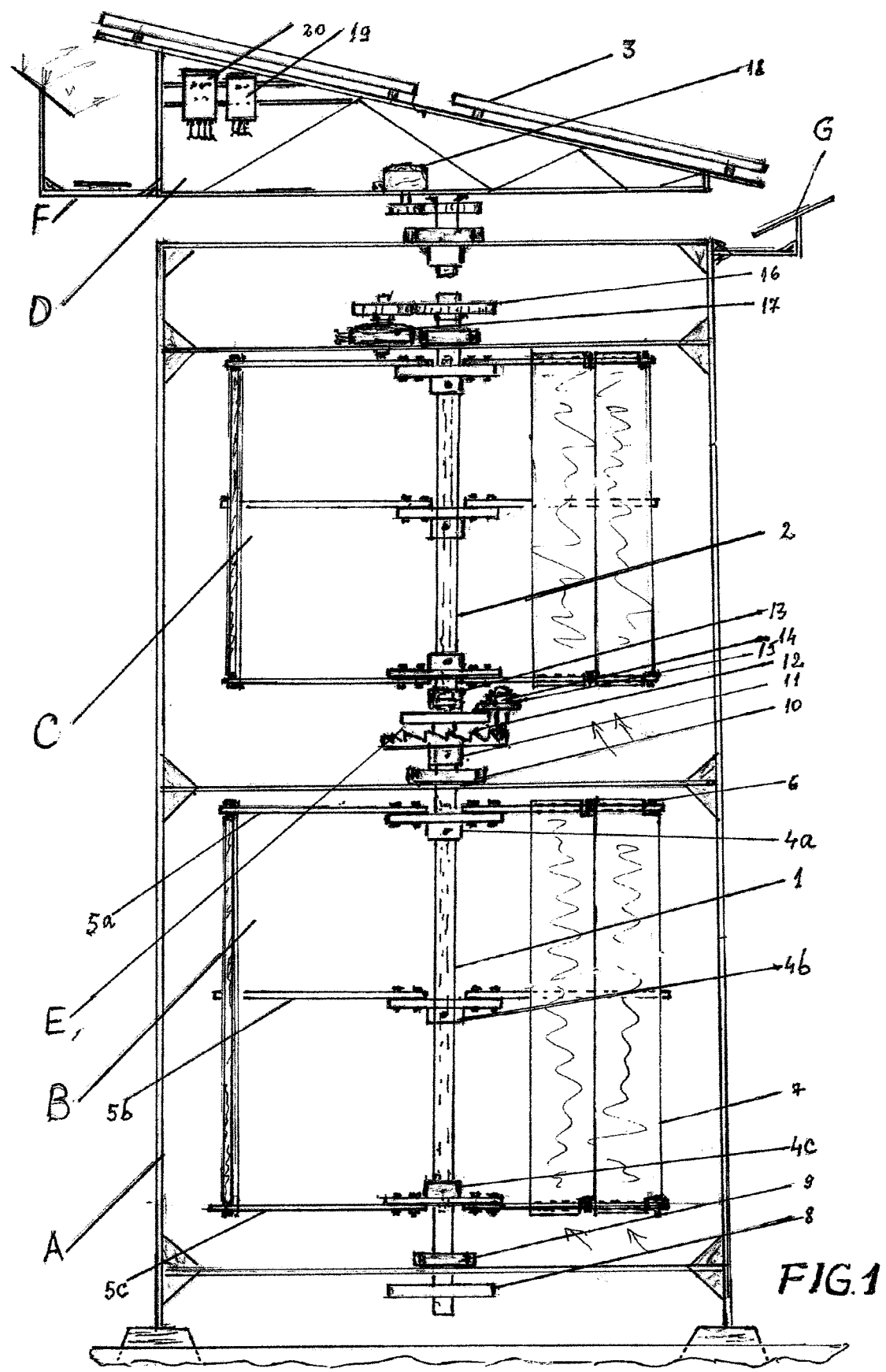
FIG. 1 illustrates a lateral view of the installation.

The installation for the combined conversion of wave, wind and solar energy, according to the invention as seen in FIG. 1 is composed of a support frame A on which are mounted vertically, superposed and interconnected three converters: a wave turbine B with vertical axis 1, a wind turbine C with vertical axis 2 and a photovoltaic platform D with bifacial PV panels 3.

Taking into account that sometimes the height of the waves can exceed the height of the wave turbine B exercising force also on the wind turbine C, the two turbines are designed to work both in wave and wind regimes being practically identical.

The wave turbine B has mounted on the vertical axis 1 some neck flanges 4a, 4b, 4c on which are fixed four groups of three arms each 5a, 5b, 5c.

Figure 2:
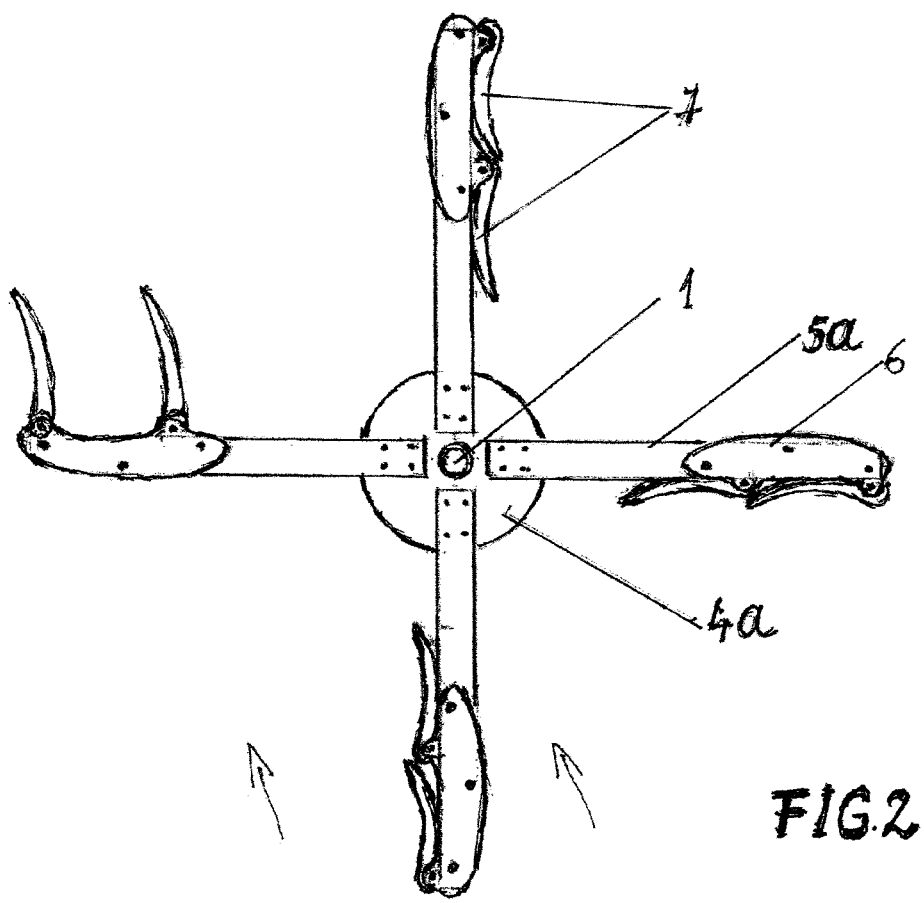
FIG. 2 illustrates a view from above of the wave turbine of the installation of FIG. 1.
Figure 3:
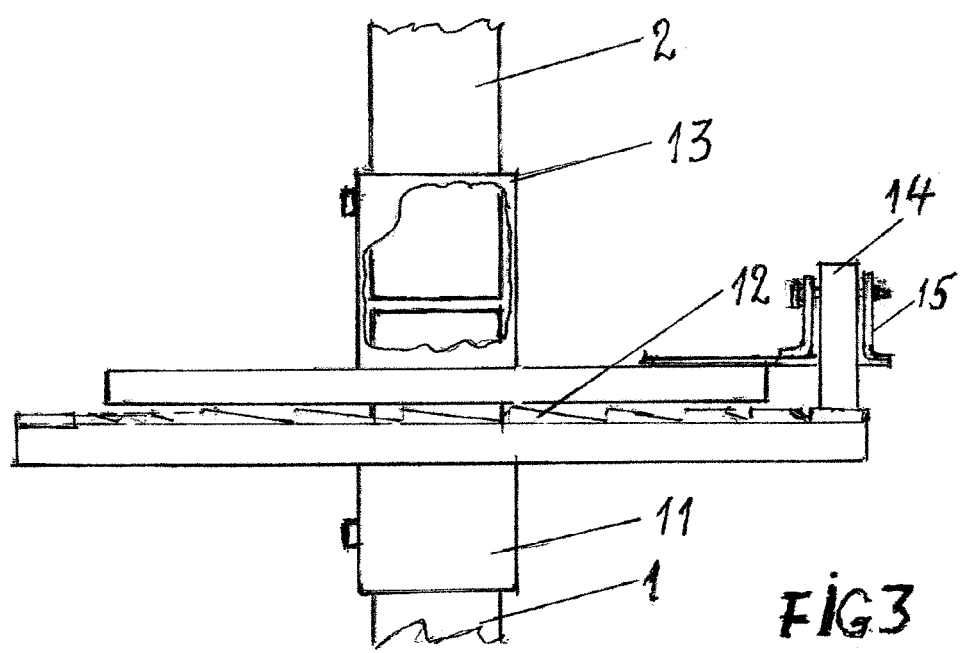
FIG. 3 illustrates a lateral (partially) cross-sectional view of the ratchet coupling of FIG. 1.
Figure 4:
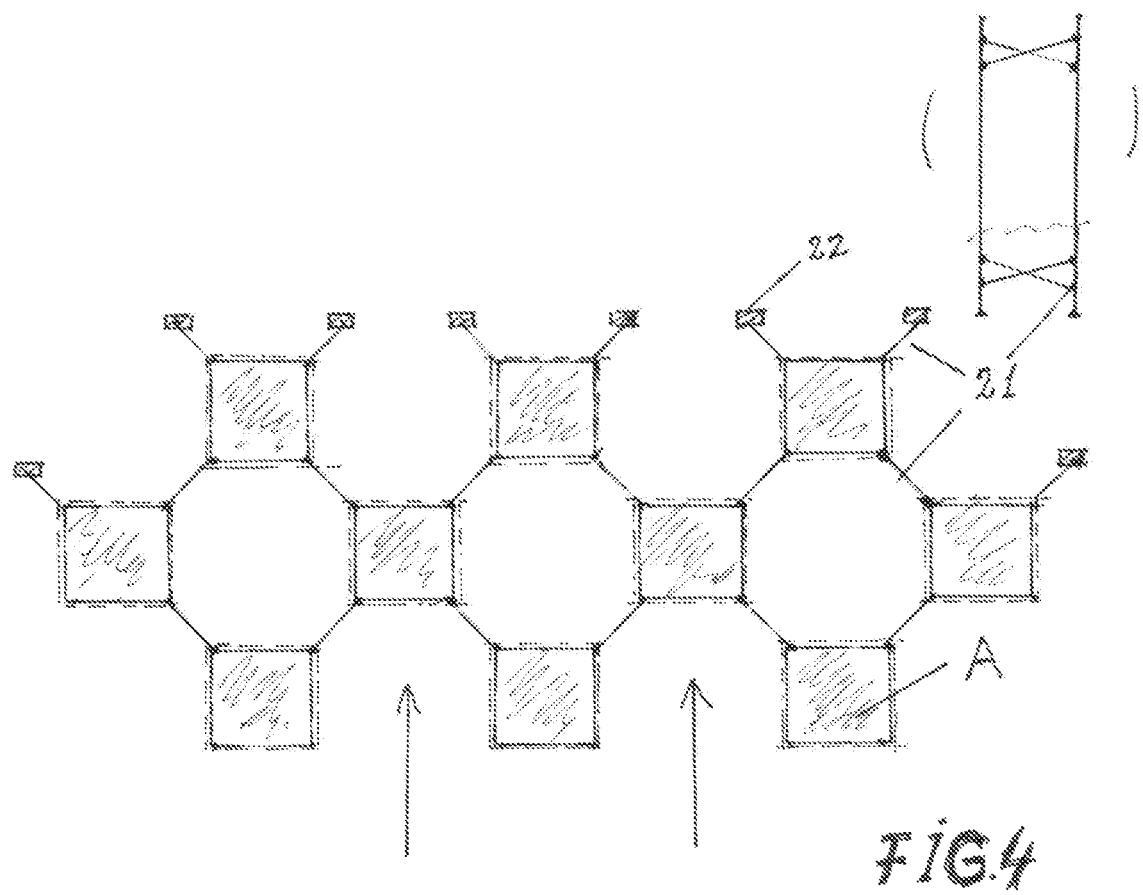
FIG. 4 illustrates a schematic view from above of a network of installations.

At the outer part of the arms 5a and 5c are fixed with some hinges 6 some blades 7 of aerodynamic shape as in FIG. 2.

The middle arm 5b has the role of support for the blades 7 when subjected to very high wave/wind forces.

The axis 1 of the wave turbine B which has at the lower end mounted a flywheel 8 for the uniformization of the rotational movement, passing through a submerged bearing 9 and a roller bearing 10 is connected to the lower end of the vertical axis 2 of the wind turbine C by means of a ratchet coupling E. The ratchet coupling E consists of a neck flange 11 fixed at the top of the axis 1, having some teeth 12 on the edge at the top and a neck flange 13 of smaller diameter and fixed on the axis 2 in which the end of the axis 1 partially enters and on which is mounted a locking lever 14 supported on a support 15 that allows the relative rotation of turbines B and C in only one direction.

More precisely, when the moment of the rotational forces acting on the blades of the wave turbine B is greater than the moment of the rotational forces acting on the blades of the wind turbine C, the locking lever 14 gets stuck in the teeth 12, so the ratchet coupling E is engaged, thus transmitting the kinetic energy of the waves with the help of axis 2 and a speed raising coupling 16 to a generator 17; contrarily, when the moment of the rotational forces acting on the blades of the wind turbine C is greater than that of the moment of the rotational forces acting on the blades of the wave turbine B, the locking lever 14 will slide on the teeth 12, the ratchet coupling E disengages, disconnecting the wave turbine, which would otherwise become a brake in the rotational movement of the wind turbine C, leading to a loss of energy.

On the platform D equipped with a solar tracker system 18 and mounted on the support frame A, it is mounted a mirror system F for reflecting the light on the back of the bifacial photovoltaic panels 3 and also a hybrid controller 19 and an inverter 20 for taking over the electricity from the generator 17 and from the PV panels 3 and bringing it to the suitable parameters for transmission in the electrical network.

In addition, a mirror system G is mounted on the sides of the support frame A also for illuminating the back of the bifacial panels 3.

In order to better fix the support frame A in the bed sea, some rectangular fixing frames 21 resting on some concrete blocks 22 are coupled in the corners diagonally, or in the case of making a network of installations (energy park) they are fixed to each other with the help of fixing frames 21.

Figure 5:
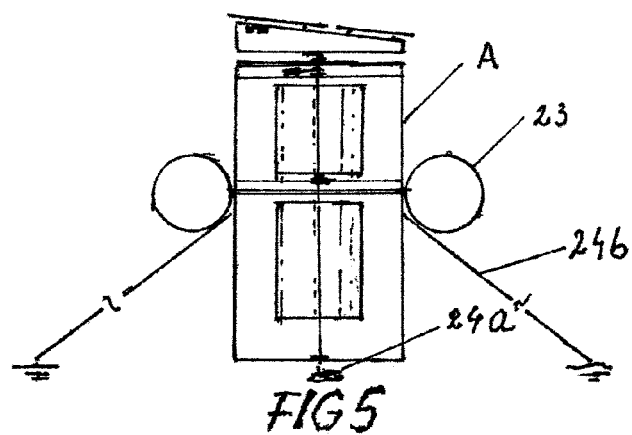
FIG. 5 illustrates a front view of an installation fixed on a pontoon.
Figure 6:
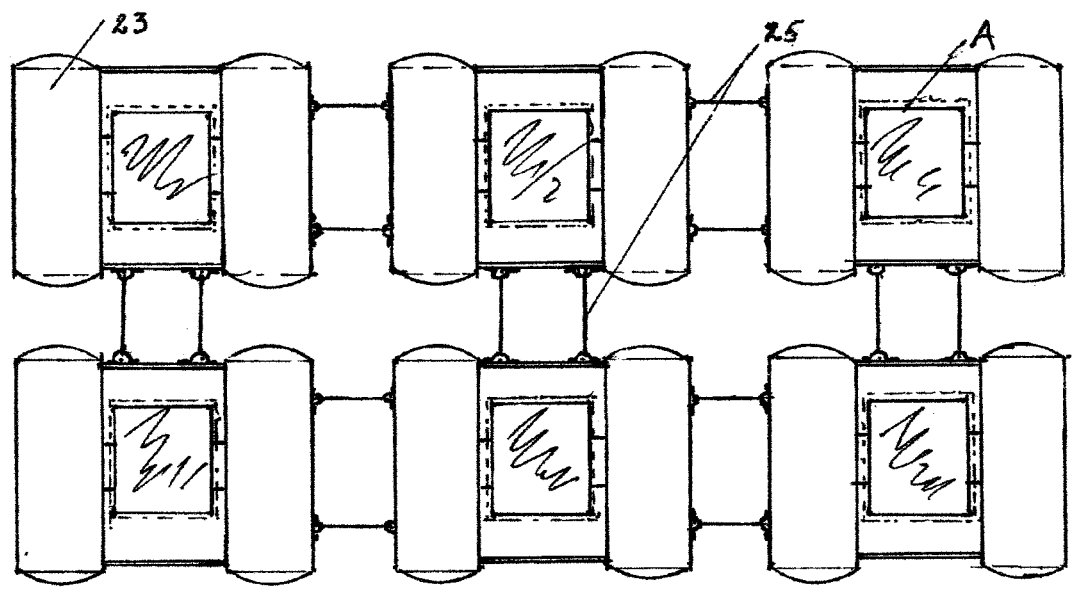
FIG. 6 illustrates a schematic view from above of a network of installations placed on pontoons.

In areas where the fixing of the support frame A on the bottom of the sea bed is difficult and/or expensive the installation can be mounted a on a pontoon 23 with the fixing anchor 24a and fixing cable 24b as in FIG. 5. And in the case of building a network of floating installations, the pontoons 23 are coupled with the help of articulated arms 25 as in FIG. 6.

By applying the invention, the following advantages are obtained:
- constructive simplification;
- low price of building, maintenance and operation;
- more efficient use of the nearshore areas;
- increasing the energy conversion efficiency per surface unit;
- wave breaker for protecting the shore;
- the possibility to adapt the size of the installations as well as the configuration of the network of installations to the specific conditions of each near shore area.

The invention claimed is:

1. An installation for the combined conversion of wave, wind, and solar energy into electricity, the installation comprising:
   a support frame having mounted vertically and interconnected a wave turbine with a vertical axis wherein at the bottom end of the axis having a flywheel and at the upper end being coupled by means of a ratchet coupling to the bottom end of the axis of a wind turbine and at the upper end of the axis of the wind turbine being coupled by means of a speed raising coupling to an electric generator;
   a photovoltaic platform, supported above and by the support frame comprising: a solar tracking system, bifacial solar panels, a mirror system, a hybrid controller and an inverter for transmission of electrical energy at the parameters corresponding to an electrical network;
   on a side of the said frame support, a second system of mirrors for the reflection of sunlight on the back of the bifacial solar panels.

2. The installation of claim 1, wherein the two wind and wave turbines, being practically identical, are designed to work in both wind and wave regimes depending on the height of the waves wherein the respective turbines comprising three neck flanges mounted on the vertical axis and on which several groups of three arms are fixed radially and at an outer part of upper and lower arms being fixed with hinges, blades of aerodynamic shape and a middle arm having the role of support for the blades at high forces of the waves/wind.

3. The installation of claim 1, wherein the wave turbine with vertical axis being coupled with the wind turbine by means of the ratchet coupling wherein more precisely a neck flange fixed to the upper part of the axis of the wave turbine having teeth on the upper edge and a second neck flange with a smaller diameter fixed to the bottom of the axis of the wind turbine in which the upper end of the axis of the wind turbine is partially inserted and on which a locking lever is mounted resting on a support fixed to this flange allowing a relative movement of the wind and wave turbines in only one direction, for the coupling/decoupling of the wave turbine depending on the power of the waves in relation to that of the wind.

4. The installation of claim 1, wherein the said photovoltaic platform comprising: the solar-tracking system, the bifacial solar panels, the mirror system for the reflection of light on the back of the bifacial solar panels, the hybrid controller and the inverter, having as support base the said support frame containing: the wave turbine further coupled by means of the ratchet coupling to the wind turbine, the wind turbine being in turn coupled by means of the speed increaser coupling to the electric generator and wherein the said support frame being fixed either in the sea bed or mounted on a pontoon; the structure being thus adapted to the near shore areas.

5. The installation of claim 1, wherein rectangular metal frames are connected to the support frames in a diagonal manner and supported on concrete pillars, or connected to a neighboring installation in the case of a network of installations to increase stability on the seabed.

6. The installation of claim 1, wherein the said installation is mounted on a pontoon and fixed in the ground with a fixing anchor or fixing cables.

7. The installation of claim 1 or 6, wherein the said installation mounted on a pontoon being laterally coupled by means of articulated arms to other neighboring installations for the realization of a network of floating installations.

8. The installation of claim 1, wherein the said photovoltaic platform comprising the bifacial solar panels has mounted the mirror system for reflecting the light on the back of the bifacial panels.

9. The installation of claim 1, wherein the mirror system is mounted of the sides of the support frame for reflecting the light on the back of the bifacial panels.

\* \* \* \* \*